United States Patent
Ramanath (10) Patent No.: US 9,813,925 B2
(45) Date of Patent: *Nov. 7, 2017

(54) SYSTEMS, METHODS, AND COMPUTER READABLE MEDIA FOR UTILIZING A PLURALITY OF UNMANNED AERIAL VEHICLES TO CONDUCT PERFORMANCE TESTING IN A WIRELESS COMMUNICATIONS NETWORK

(71) Applicant: Ixia, Calabasas, CA (US)

(72) Inventor: Avinash Ramanath, Valencia, CA (US)

(73) Assignee: Ixia, Calabasas, CA (US)

( * ) Notice: Subject to any disclaimer, the term of this patent is extended or adjusted under 35 U.S.C. 154(b) by 375 days.

This patent is subject to a terminal disclaimer.

(21) Appl. No.: 14/549,520

(22) Filed: Nov. 20, 2014

(65) Prior Publication Data

US 2016/0150427 A1    May 26, 2016

(51) Int. Cl.
  *H04W 24/06*  (2009.01)
  *H04L 12/26*  (2006.01)

(52) U.S. Cl.
  CPC ............. *H04W 24/06* (2013.01); *H04L 43/50* (2013.01)

(58) Field of Classification Search
  CPC ........ H04W 24/00; H04W 24/06; H04L 43/50
  See application file for complete search history.

(56) References Cited

U.S. PATENT DOCUMENTS

| | | |
|---|---|---|
| 6,973,518 B2 | 12/2005 | Purpura |
| 7,286,802 B2 | 10/2007 | Beyme et al. |
| 7,349,670 B2 | 3/2008 | Mlinarsky et al. |
| 7,643,936 B1 | 1/2010 | Boxberger et al. |
| 7,702,330 B2 | 4/2010 | Alexander et al. |

(Continued)

FOREIGN PATENT DOCUMENTS

| | | |
|---|---|---|
| WO | WO 2012/110054 A1 | 8/2012 |
| WO | WO 2015/069528 A1 | 5/2015 |

OTHER PUBLICATIONS

Communication of European publiaction number and information on the application of Article 67(3) EPC for European Application No. 14860805.2 (Aug. 18, 2016).

(Continued)

*Primary Examiner* — Edan Orgad
*Assistant Examiner* — Jeremy Costin
(74) *Attorney, Agent, or Firm* — Jenkins, Wilson, Taylor & Hunt, P.A.

(57) ABSTRACT

According to one aspect, the disclosed subject matter describes herein a method that includes navigating, by a plurality of unmanned aerial vehicles (UAVs), a service coverage area associated with a wireless communications network, wherein the service coverage area includes a plurality of wireless access points and assigning, by at least one of the UAVs, wireless access points to one or more of the UAVs for wireless traffic testing. The method further includes executing, for each of the wireless access points, a wireless traffic test including test traffic data communicated between at least one of the UAVs and a tested wireless access point and determining, for each of the wireless access points to be tested, performance metric information associated with traffic data being wirelessly communicated between the tested wireless access point and the at least one of the UAVs.

20 Claims, 3 Drawing Sheets

(56) References Cited

U.S. PATENT DOCUMENTS

| | | | |
|---|---|---|---|
| 8,145,136 | B1 | 3/2012 | Bharghavan |
| 8,526,470 | B2 * | 9/2013 | Ramanath ............... H04L 67/08 370/389 |
| 8,526,938 | B1 | 9/2013 | Gardner |
| 9,301,170 | B2 * | 3/2016 | Rangappagowda .. H04W 24/06 |
| 2005/0201293 | A1 * | 9/2005 | Miller ...................... H04L 1/24 370/241 |
| 2008/0240044 | A1 | 10/2008 | Khamar |
| 2009/0013210 | A1 * | 1/2009 | McIntosh ............ H04L 12/2697 714/4.1 |
| 2009/0094492 | A1 | 4/2009 | Music et al. |
| 2011/0310745 | A1 | 12/2011 | Goria et al. |
| 2012/0051224 | A1 | 3/2012 | Olgaard et al. |
| 2013/0151062 | A1 | 6/2013 | Lee et al. |
| 2014/0319272 | A1 * | 10/2014 | Casado Magana ....... B64F 1/04 244/110 E |
| 2015/0126129 | A1 | 5/2015 | Rangappagowda et al. |

OTHER PUBLICATIONS

Notice of Allowance and Fee(s) Due for U.S. Appl. No. 14/229,791 (dated Nov. 13, 2015).

Notice of Allowance and Fee(s) Due for U.S. Appl. No. 14/229,791 (dated Jul. 22, 2015).

Commonly-assigned, co-pending International Application No. PCT/US14/63000 for "Systems, Methods, and Computer Readable Media for Utilizing a Mobile Robotic Platform to Conduct Functionality Testing in a Wireless Communications Network," (Unpublished, filed Oct. 29, 2014).

Commonly-assigned, co-pending U.S. Appl. No. 14/229,791 for "Systems, Methods, and Computer Readable Media for Utilizing a Mobile Robotic Platform to Conduct Functionality Testing in a Wireless Communications Network," (Unpublished, filed Mar. 28, 2014).

Notification of Transmittal of the International Search Report and the Written Opinion of the International Searching Authority, or the Declaration for PCT International Application No. PCT/US2014/063000 (dated Feb. 16, 2015).

Fernandez, "Robots Play Football to Test Wireless Network Load Capabilities," ComputerWeekly.com, http://www.computerweekly.com/news/2240113672/Robots-play-football-to-test-wireless-network-load-capabilities (Jan. 11, 2012).

"Intel and Cisco: Collaborative Testing of a Media-Ready WLAN Solution," pp. 1-6 (2011).

Ikuno et al., "System Level Simulation of LTE Networks," IEEE 71st Vehicular Technology Conference (VTC 2010-Spring), pp. 1-5 (May 2010).

"Take a Look Inside Intel's State-of-the-Art Mobility Test Facility," Youtube. (https://www.youtube.com/watch?v=8WPBMBz9n7A (May 7, 2009).

France Telecom R&D, "WCDMA-HSDPA System Level Simulator Calibration," R1-040499. 3GPP TSG-RAN-1 Metting #37, Montreal, Canada, pp. 1-8 (May 10-14, 2004).

Extended European Search Report for European Application No. 14860805.2 (dated Apr. 13, 2017).

* cited by examiner

SYSTEMS, METHODS, AND COMPUTER READABLE MEDIA FOR UTILIZING A PLURALITY OF UNMANNED AERIAL VEHICLES TO CONDUCT PERFORMANCE TESTING IN A WIRELESS COMMUNICATIONS NETWORK

TECHNICAL FIELD

The subject matter described herein relates to methods and devices used for testing access points in wireless networks. More particularly, the subject matter described herein relates to systems, methods, and computer readable media for utilizing a plurality of unmanned aerial vehicles to conduct performance testing in a wireless communications network.

BACKGROUND

In the deployment and maintenance of wireless communications networks, it is necessary for performance measurements to be taken at multiple locations in the service coverage area to ensure that all elements contributing toward the achieving of a desired performance are functioning properly. This activity is referred to in the industry as a "site survey" and typically results in a report that indicates a level of performance with respect to defined geographical location or building structure. As wireless communications networks have evolved to support several hundred megabits of data per second, these networks are becoming more vital to the daily operation of businesses, educational institutions, health care facilities, and public gathering venues. Thus, frequent and reliable testing of the functionality of these wireless communications networks becomes significantly important. Challenges associated with performing a site survey include manpower and time considerations that are necessary to perform a thorough survey. Existing site survey tools presently require a test administrator to walk the site location (e.g., access point service coverage area) to be surveyed. However, such a procedure may consume a considerable amount of time in order to achieve a comprehensive site survey.

Accordingly, there exists a need for systems, methods, and computer readable media for utilizing a plurality of unmanned aerial vehicles to conduct performance testing in a wireless communications network.

SUMMARY

Systems, methods, and computer readable media for utilizing a plurality of unmanned aerial vehicles to conduct performance testing in a wireless communications network are disclosed. According to one aspect, the subject matter described herein includes a system including a plurality of unmanned aerial vehicles (UAVs) configured to navigate within a service coverage area associated with a plurality of wireless access points belonging to a wireless communications network. Each of the UAVs may include i) a coordination module configured to assign each of the wireless access points to one or more of the UAVs for wireless traffic testing, ii) a device emulation module configured to execute a wireless traffic test that includes test traffic data communicated between at least one of the UAVs and a tested wireless access point belonging to the plurality of wireless access points and iii) a performance metrics module configured to determine, for each of the wireless access points to be tested, performance metric information associated with the test traffic data being wirelessly communicated between the tested wireless access point and at least one of the UAVs.

According to one aspect, the subject matter described herein includes a method that comprises navigating, by a plurality of unmanned aerial vehicles (UAVs), a service coverage area associated with a wireless communications network, wherein the service coverage area includes a plurality of wireless access points and assigning, by at least one of the UAVs, wireless access points to one or more of the UAVs for wireless traffic testing. The method further includes executing, for each of the wireless access points, a wireless traffic test including test traffic data communicated between at least one of the UAVs and a tested wireless access point and determining, for each of the wireless access points to be tested, performance metric information associated with traffic data being wirelessly communicated between the tested wireless access point and the at least one of the UAVs.

The subject matter described herein may be implemented in hardware, software, firmware, or any combination thereof. As such, the terms "function", "node" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to systems, methods, and computer readable media for utilizing a plurality of unmanned aerial vehicles (UAVs) to conduct performance testing in a wireless communications network. Reference will now be made in detail to exemplary embodiments of the presently disclosed subject matter, examples of which are illustrated in the accompanying drawings. Wherever possible, the same reference numbers will be used throughout the drawings to refer to the same or like parts.

Various embodiments of the present subject matter are disclosed and described herein.

Figure 1:
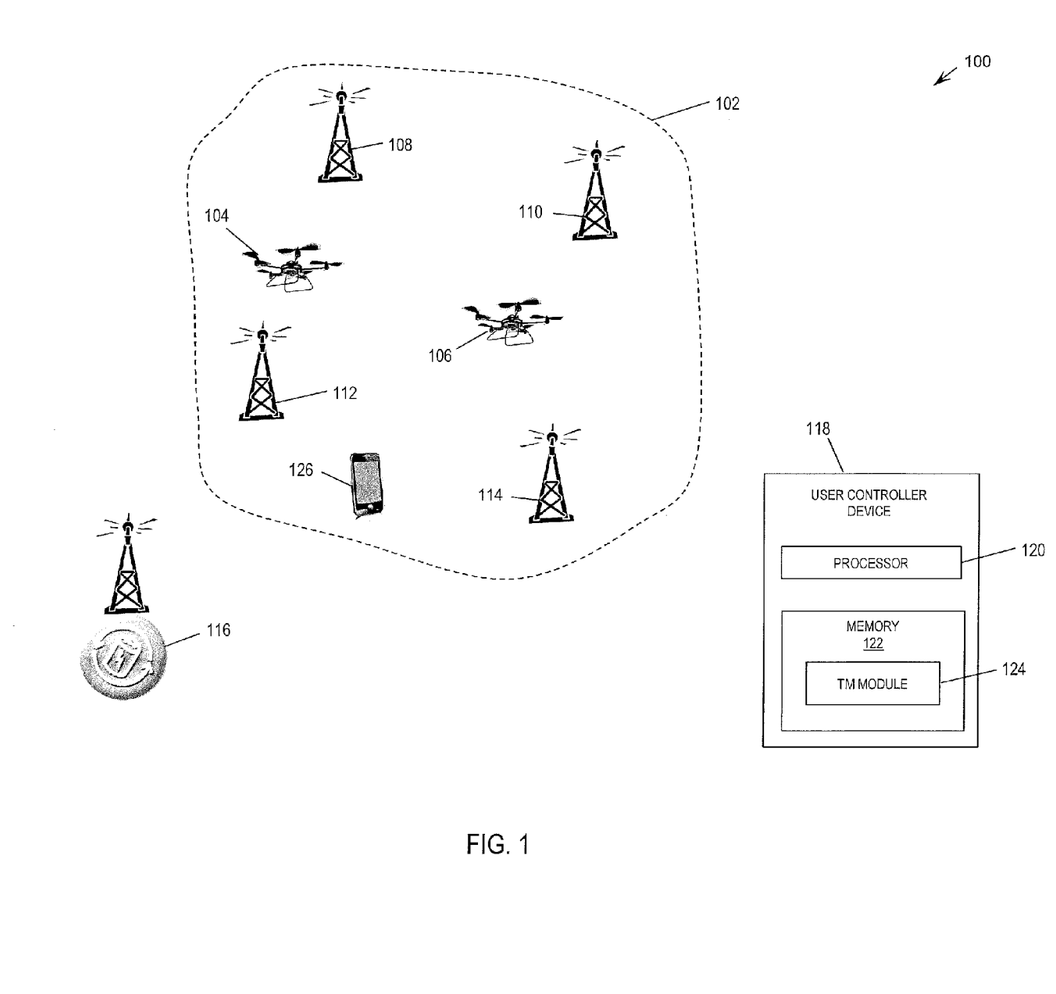
FIG. 1 is a diagram illustrating an exemplary wireless communications network that includes wireless access points under test according to an embodiment of the subject matter described herein.

FIG. 1 is a diagram illustrating a test system 100 that includes a plurality of unmanned aerial vehicles (UAVs) 104-106 used for testing the load, performance, and functionality capabilities of wireless access points 108-114 located in a service coverage area 102 of a wireless communications network. In some embodiments, each of wireless access points 108-114 may include an access point element or unit, such as a Wi-Fi access point. In alternate embodiments, each of access points 108-114 may include an eNodeB, a NodeB, a base transceiver station (BTS), or the like. Similarly, service coverage area 102 may represent the geographical area in which wireless access points 108-114 are able to establish a wireless communication link (e.g., a cellular communications link) with mobile devices, such as mobile device 126. Although only four wireless access points are depicted in FIG. 1, additional wireless access points may be utilized without departing from the scope of the disclosed subject matter. System 100 may also include a wireless charging area station 116 that may be configured to wirelessly supply electrical power to a UAV that positions itself in close proximity (e.g., wireless range) to station 116. Notably, each of the UAVs 104-106 deployed for testing may be provided with predefined global positioning system (GPS) coordinates that indicates the physical location of wireless charging area station 116.

In FIG. 1, mobile device 126 may include any mobile device configured to establish a wireless connection with one or more of access points 108-114 via wireless communications. For example, the wireless connection may include a Wi-Fi connection, a 3G connection, a 4G or long term evolution (LTE) connection, and the like. In some embodiments, mobile device 126 may include a cellular phone, a mobile smartphone, a tablet computer (e.g., an iPad), a personal digital assistant (PDA), a laptop computer, or any other mobile computing device equipped with wireless communication capabilities. In some embodiments, mobile device 126 may be attached to one or more of UAVs 104-106 (e.g., real client device 206 in FIG. 2).

As shown in FIG. 1, system 100 may also include a plurality of UAVs 104-106 that may be configured to traverse service coverage area 102. Although only two UAVs are depicted in FIG. 1, additional UAVs may be utilized without departing from the scope of the disclosed subject matter. In some embodiments, each of UAVs 104-106 may comprise a drone, a quadcopter, or like device that is configured to navigate within a network under test and apply a test traffic load (e.g., test packet traffic, application traffic, multimedia traffic, etc.) to one or more of wireless access points 108-114. Notably, each of UAVs 104-106 may be configured to emulate a plurality of emulated devices (e.g., emulated virtual client devices or emulated virtual server devices) that transmits simulated test traffic data to each of access points 108-114. Additional information regarding the functionality and internal components of an exemplary UAV is provided in the description of FIG. 2 below.

System 100 also includes a user controller device 118. In some embodiments, user controller device 118 may include any computer device (e.g., a personal computer, a laptop computer, a control panel, etc.) that enables a test administrator or a network operator to manage the operation and load testing functionality of UAVs 104-106. In some embodiments, user controller device 118 can include a processor 120 and a test management module 124. In some embodiments, processor 120 may include a microprocessor, central processing unit (CPU), or any other like hardware based processor unit that is configured to execute and/or utilize test management module 124 (e.g., a software based algorithm, such as an Ixia WaveDeploy application) to apply a test load to a wireless access point under test and to derive and/or analyze performance metric data received from a testing UAV. Test management module 124 may be stored in memory 122, such as random access memory (RAM), read only memory (ROM), optical read/write memory, cache memory, magnetic read/write memory, flash memory, or any other non-transitory storage media, of controller device 118. Notably, processor 120 and memory 122 may be used to execute and manage the operation of test management module 124.

In some embodiments, user controller device 118 may be communicatively connected with each of UAVs 104-106. For example, a test administrator may utilize controller device 118 to provision each of UAVs 104-106 with operational data that can be utilized or applied during a testing procedure. In some embodiments, controller device 118 may be used to provide GPS coordinate data associated with access points 108-114, charging station 116, and/or the boundary of service area 102 to UAVs 104-106.

Figure 2:
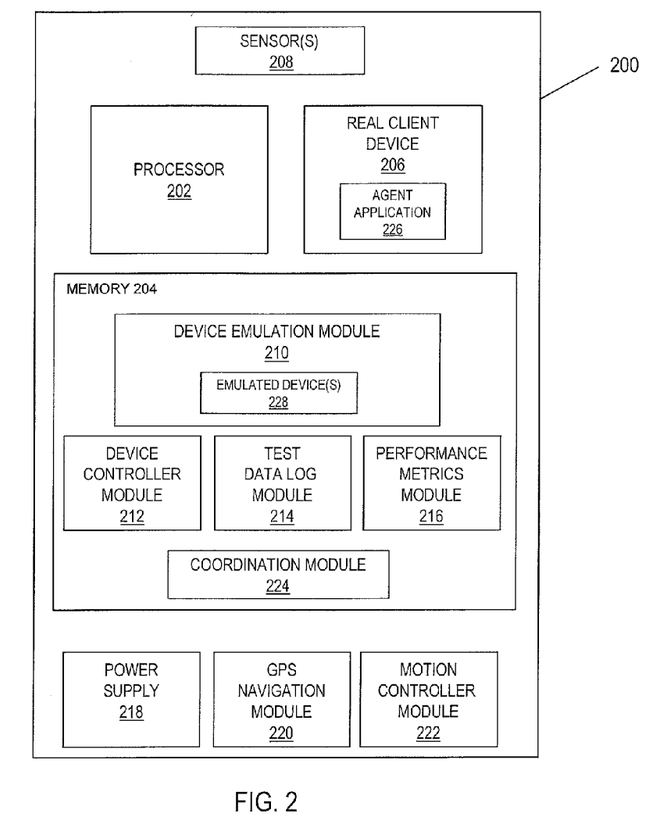
FIG. 2 is a block diagram illustrating an exemplary unmanned aerial vehicle configured to conduct performance testing in a wireless communications network according to an embodiment of the subject matter described herein.

FIG. 2 is a block diagram illustrating the components of an exemplary UAV 200 configured to conduct wireless access point testing according to an embodiment of the subject matter described herein. It should be noted that UAV 200 and its components and functionality described herein constitute a special purpose test device that improves the technological field of wireless communications testing by providing a mobile and autonomous testing platform that is configured to efficiently assess the wireless communications capabilities of large or inaccessible site locations. In some embodiments, UAV 200 may be configured to include a device emulation module 210, a device controller module 212, a test data log module 214, a performance metrics module 216, a coordination module 218, a GPS navigation module 220, and a motion controller module 222. Exemplary UAV 200 may also include a power supply unit 224. As shown in FIG. 2, UAV 200 may include a processor 202. In some embodiments, processor 202 may include a microprocessor, central processing unit (CPU), or any other like hardware based processor device that is configured to execute and/or utilize modules 210-216 in UAV 200. Similarly, UAV 200 may include memory 204, which can comprise random access memory (RAM), read only memory (ROM), optical read/write memory, cache memory, magnetic read/write memory, flash memory, or any other non-transitory computer readable medium. In some embodiments, processor 202 and memory 204 can be used to execute and manage the operation of modules 210-216, which are described below.

In some embodiments, device emulation module 210 may comprise hardware in combination with software and/or firmware that is adapted to emulate multiple client or server devices with wireless capabilities. Notably, device emulation module 210 may be configured to emulate either i) one or more client devices or ii) one or more server devices depending on the particular directional testing that is being subjected to the wireless access point under test. In some embodiments, device emulation module 210 may comprise separate and distinct emulation modules, such as a first emulation module dedicated for the emulation of client devices and a second emulation module dedicated for the emulation of server devices. Exemplary wireless client devices that may be emulated include, but are not limited to, mobile smartphones, laptop computers, tablet computers, iPads, and the like. Exemplary wireless server devices include, but are not limited to, application servers, web servers, database servers, voice over IP (VoIP) servers, and the like. Moreover, a wireless server device may also include a calling party cellphone that is effectively functioning as a server entity to a "client" called party device by streaming a video chat session being communicated between the two devices.

In some embodiments, device emulation module 210 may be configured to enable each of a plurality of emulated client devices (e.g., represented by emulated devices 228 in FIG. 2) to establish a wireless connection with one or more of wireless access points 108-114 (as shown in FIG. 1). For example, the established wireless connection may be a radio frequency (RF) connection to a cellular access point associated with a long term evolution (LTE) network under test. Alternatively, the wireless connection may include an over-the-air (OTA) connection to a Wi-Fi access point associated with a Wi-Fi network under test. In one exemplary scenario, device emulation module 210 may be configured to emulate N mobile smartphones and/or laptops which are adapted to establish N respective Wi-Fi air-interface connections with a Wi-Fi access point (e.g., wireless access point 108 in FIG. 1). The Wi-Fi air-interface connections established with the Wi-Fi access point enables the emulated client devices 228 to send Internet protocol (IP) test traffic data to the serving Wi-Fi access point. Similarly, the Wi-Fi air-interface connections established with the Wi-Fi access point enables the emulated client devices to receive IP traffic from the serving Wi-Fi access point.

In some embodiments, device controller module 212 is configured to function with device emulation module 210 in order to administer and control the operation of each of the emulated client devices 228. Device controller module 212 may also include or have access to test traffic data that is generated by each of the emulated devices 228 during the course of a performance or load test. As such, device controller module 212 may be used to conduct and manage the aggregate load testing of a wireless access point that is connected to multiple emulated devices 228. Although client devices are emulated in the description above, device emulation module 210 and device controller module 212 may be used to emulate and control emulated server devices without departing from the scope of the disclosed subject matter.

As shown in FIG. 2, UAV 200 may also include a performance metrics module 216. Performance metrics module 216 may be configured to process test traffic data communicated between i) an access point under test and ii) at least one of device emulation module 210 (e.g., multiple emulated client devices or multiple emulated server devices 228) and/or real client device(s) 206 (as mentioned below). Specifically, performance metrics module 216 may derive performance metric data from the processed test traffic data in real-time. Performance metrics module 216 may also be configured to utilize the performance metric data to measure the functionality and performance of the access point under test and/or real client device(s) 206 under loaded conditions. In an alternate embodiment, performance metrics module 216 may be configured to forward the performance metric data to test management module 124 in controller 106 (see FIG. 1) for further measurement processing. In some embodiments, performance metrics module 216 may be configured to ascertain the performance of each of the various channels and/or frequencies supported by the access points under test. Such channel specific testing capability enables performance metric module 216 to provide a highly defined performance assessment.

In some embodiments, UAV 200 may autonomously navigate within the service coverage area (e.g., area 102) of the network under test. UAV 200 may include a motion controller module 222 (e.g., a spatial movement controller module) that comprises software and data structures configured to enable UAV 200 to move and generally navigate autonomously under its own power within the coverage area of the network under test without any real-time communication from an external human operator. In some embodiments, motion controller module 222 may have access to a GPS transceiver (e.g., included in GPS navigation module 220), a camera, and/or pre-programmed route data or instructions (e.g., a flight path including a defined route using GPS coordinates). In some embodiments, motion controller module 222 may have access to one or more onboard proximity sensors (e.g., sensor(s) 208) that are configured to detect the presence of obstacles, such as building structures, utility poles, transmission lines, and natural obstructions (e.g., trees, outcroppings, etc.). Notably, motion controller module 222 may be configured to use sensor 208 to implement navigation controls sufficient to autonomously avoid potential obstacles. Although only one sensor is depicted in FIG. 2, additional sensors may be utilized by UAV 200 without departing from the scope of the disclosed subject matter.

In one alternate embodiment, UAV 200 may be navigated in a non-autonomous or semi-autonomous manner from the perspective of movement within the service coverage area of the network under test. In this scenario, motion controller module 222 (e.g., a spatial movement controller module) includes software and data structures sufficient to enable UAV 200 to move and generally navigate under its own power within the service coverage area of the network under test with some real-time communications and/or instructions provided from a remotely located human operator.

In some embodiments, UAV 200 may be powered by an onboard power supply unit 224, e.g., one or more rechargeable battery units. Power from the onboard power supply unit 224 may be used to deliver electricity to onboard motors that provide flight capability to UAV 200. Power supply unit 224 may also be used to power onboard electrical systems on UAV 200, such as computer systems, communication systems, and sensor arrays. In some embodiments, motion controller module 222 may be configured to monitor the power level of power supply unit 224 and determine if the power level falls or drops below a predefined threshold value. In the event the power level falls below a predefined threshold value (e.g., a defined voltage threshold amount), motion controller module 222 may be configured to use GPS navigation module 220 (and predefined GPS coordinates) to autonomously navigate UAV 200 to a wireless charging area station to recharge power supply unit 224.

In some embodiments, UAV 200 may include a global positioning system (GPS) navigation module 220 that is configured to receive GPS signals from satellites (e.g., using a GPS transceiver chipset) to calculate GPS coordinates. The calculated GPS coordinates may be utilized by GPS navigation module 220 to calculate the position, velocity, and heading of UAV 200. In some embodiments, a plurality of GPS coordinates that represents a desired path may be provided to GPS navigation module 220 by a test administrator (e.g., using user controller device 118 or loaded with a preprogrammed navigation application). Similarly, GPS navigation module 220 may be configured to electronically receive GPS coordinates that define specific location points (e.g., identified access points under test). These location points may correspond to access points located within a facility or service coverage area to be subjected to a site assessment. Alternatively, these location points may specify the predefined location in which the UAV is to be positioned during the testing procedure. In some embodiments, a test administrator may electronically upload an ordered listing of GPS coordinates to GPS navigation module 220. Notably, the GPS coordinate data provided to GPS navigation module 220 may be stored for subsequent tests (i.e., use the same pattern in order to eliminate test point location inconsistencies in subsequent site assessments). Although navigation module 220 is described above with respect to GPS, any other coordinate system may be utilized without departing from the scope of the disclosed subject matter. For example, in some embodiments, an ad hoc coordinate system utilizing coordinates relative to the area defined by a site's boundary (e.g., boundary of area 102) may be utilized in lieu of or in addition to GPS coordinates.

In some embodiments, UAV 200 includes a test coordination module 218 that is configured to conduct the coordination of all UAVs used to conduct a performance test in a service coverage area. For example, one of the plurality of UAVs (e.g., UAVs 104-106) deployed to the service coverage area is designated (e.g., via an algorithm, by default, preprogrammed, etc.) as a lead UAV. The designated lead UAV may then utilize coordination module 218 to segment service coverage area 102 (which may be predefined and supplied by a test administrator using GPS coordinates) into two or more sections. Notably, each of the defined sections may include at least one wireless access point that requires testing. The lead UAV may use coordination module 218 to subsequently assign each of the predefined sections and/or wireless access points among the deployed UAVs. For example, UAV 104 in FIG. 1 may be designated as the lead UAV and utilize its coordination module 218 to assign wireless access points 108-110 (and/or the portion of service area 102 that includes access points 108-110) to UAV 106 and assign wireless access points 112-114 (and/or the portion of service area 102 that includes access points 112-114) to itself. Once the assignments are made, the multiple UAVs 104-106 may perform the appropriate wireless communication tests in a cooperative manner. In some embodiments, UAVs 104-106 may coordinate the assignment process amongst themselves (without a designated lead unit) by selecting sections of area 102 in an independent (yet, not repetitive) manner. Notably, the coordination module 218 located in each of the UAVs 104-106 may utilize the wireless communications capabilities (e.g., via a Wi-Fi link) of its host UAV to coordinate the aforementioned assignment process(es).

In some embodiments, each of a plurality of UAVs may utilize its respective coordination module 218 to execute performance tests between the UAVs themselves. For example, two UAVs may establish a wireless communications link to each other via a tested wireless access point. At least one of the coordination modules may (e.g., via a direct Wi-Fi link) designate each of the two UAVs to respectively emulate a server entity and a client entity (e.g., UAV 104 configures its device emulation module to function as a server entity while UAV 106 configures its device emulation module to function as a client entity while connected to access point 108 in FIG. 1). In some embodiments, the coordination modules of may also be configured to switch the server-client roles (e.g., the coordination modules may manage the configuration of the UAVs' device emulation modules) of the two UAVs in order to obtain performance metric data that is representative of test traffic data flowing through the tested access point in the opposite direction. Such a configuration can also be used to enable the UAVs to simulate mobility and check the performance of the access point as well as the server. Similarly, the coordination modules may configure each of the UAVs simulate a peer controller, such as a voice peer controller participating in a VoIP call (e.g., designate the UAVs as a calling party device and a called party device) or a media gateway control protocol (MGCP) peer controller.

In some embodiments, UAV 200 may be configured to include one or more real client devices 206. Real client device 206 may include a physical (e.g., non-emulated) mobile cellphone, mobile smartphone, tablet computer device, laptop computer, or the like. In some embodiments, real client device 206 may include a software test agent application 226 that is loaded on real client device 206 prior to test execution. Software test agent application 226 (e.g., Ixia WaveAgent application) may be configured to execute a traffic load test, which may involve the sending and/or receiving of test traffic data after real client device 206 has established a wireless connection to the access point to be tested. Exemplary traffic data may include simulated traffic data that is generated by a media streaming simulation application (not shown) that is executed by software test agent application 226. In some embodiments, software test agent application 226 may generate statistical information based on collected performance metric data associated with the load test. Software test agent application 226 may also manage and report the generated statistical information to test data log module 214. In some embodiments, test data log module 214 may be configured to receive and maintain log information provided by device emulation module 210 and/or real client device 206. For example, test data log module 214 may manage information related to the test traffic data sent from each of the emulated client device(s) and each of the real client device(s). This information may include the amount of traffic sent (e.g., packet throughput), packet loss statistical information, signal strength measurements, retransmission statistical information, throughput latency, and the like.

Figure 3:
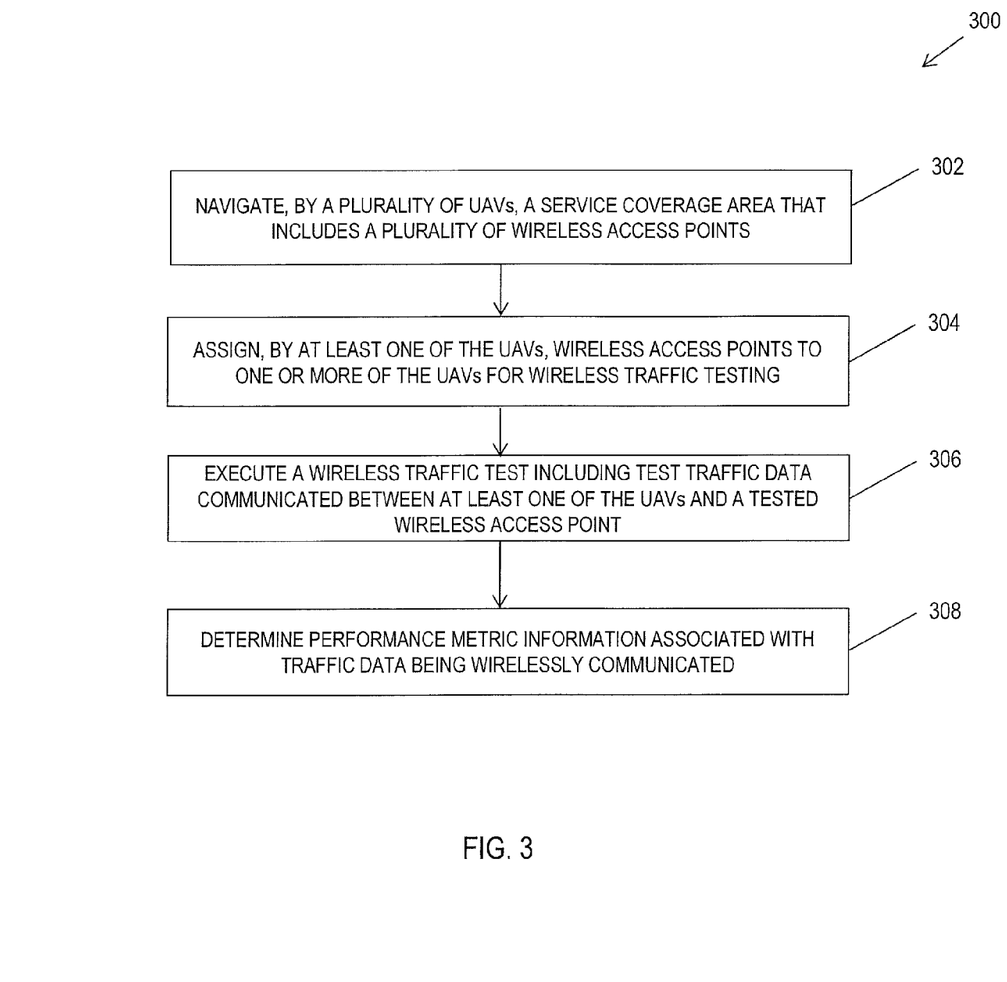
FIG. 3 is a flow chart illustrating an exemplary process for utilizing a plurality of unmanned aerial vehicles to conduct performance testing in a wireless communications network according to an embodiment of the subject matter described herein.

FIG. 3 is a flow chart illustrating an exemplary method 300 for utilizing a plurality of UAVs to conduct performance testing in a wireless communications network according to an embodiment of the subject matter described herein. In step 302, UAVs navigate within a service coverage area including a plurality of wireless access points. In some embodiments, a plurality of UAVs is deployed in a service coverage area containing wireless access points that require performance testing. For example, the UAVs may utilize GPS to navigate a service coverage area that is defined by GPS coordinates.

In step 304, wireless access points are assigned to one or more of the UAVs for purposes of wireless traffic testing. In some embodiments, one of the deployed UAVs is designated as a lead UAV and is responsible for apportioning the service coverage area into segments that are assigned to each of the deployed UAVs. Alternatively, the lead UAV may be configured to apportion and assign specific wireless access points to each of the deployed UAVs in the service coverage area.

In step 306, wireless traffic tests are executed. In some embodiments, for each of the wireless access points, a wireless traffic test including test traffic data communicated is executed between at least one of the UAVs and a tested wireless access point. For example, a UAV may utilize its client device emulation module to emulate multiple client devices that are wirelessly connected to a tested wireless access point via multiple wireless connections. Notably, the client devices emulated by the UAV may generate emulated test traffic that is communicated to the tested wireless access point (e.g., a wireless access point under test) via the multiple wireless connections.

In step 308, wireless communication performance metric data is determined. In some embodiments, each UAV includes a performance metrics module that is configured to determine wireless communication performance metric data associated with the test traffic data communicated between the tested wireless access point and the emulated client devices associated with the UAV via the wireless connection(s).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system for testing wireless access points associated with a wireless communications network, the system comprising:
a plurality of unmanned aerial vehicles (UAVs) configured to navigate within a service coverage area associated with a plurality of wireless access points belonging to a wireless communications network, wherein each of the UAVs includes:
a coordination module configured to assign each of the wireless access points;
a device emulation module configured to execute a wireless traffic test that includes test traffic data communicated between at least one of the UAVs and a tested wireless access point belonging to the plurality of wireless access points; and
a performance metrics module configured to determine, for each of the wireless access points to be tested, performance metric information associated with the test traffic data being wirelessly communicated between the tested wireless access point and at least one of the UAVs;
wherein each of the UAVs is configured to navigate within the service coverage area using global positioning system (GPS) coordinates via an onboard GPS navigation module.

2. The system of claim 1 wherein the device emulation module is further configured to emulate multiple client devices that are wirelessly connected to a tested wireless access point via multiple wireless connections, wherein the emulated client devices generate emulated test traffic that is communicated to the tested wireless access point via the multiple wireless connections.

3. The system of claim 2 wherein the performance metrics module is further configured to determine performance metric information associated with traffic data being wirelessly communicated between the tested wireless access point and at least one of the emulated client devices.

4. The system of claim 1 wherein each of the UAVs utilizes the GPS navigation module to autonomously navigate to a wireless charging area station in the event a power level of an onboard power supply falls below a predefined threshold.

5. The system of claim 1 wherein each of the UAVs includes at least one real client device that comprises a client application configured to establish a wireless connection with the tested wireless access point and to communicate simulated test traffic data to the wireless access point via the established wireless connection.

6. The system of claim 5 wherein the performance metrics module is further configured to determine performance metric information associated with the simulated test traffic data being wirelessly communicated between the wireless access point and the at least one real client device.

7. The system of claim 1 wherein the device emulation module is further configured to emulate multiple server devices that are wirelessly connected to a tested wireless access point via multiple wireless connections, wherein the emulated server devices generate emulated test traffic that is communicated to the tested wireless access point via the multiple wireless connections.

8. A system for testing wireless access points associated with a wireless communications network, the system comprising:
a plurality of unmanned aerial vehicles (UAVs) configured to navigate within a service coverage area associated with a plurality of wireless access points belonging to a wireless communications network, wherein each of the UAVs includes:
a coordination module configured to assign each of the wireless access points;
a device emulation module configured to execute a wireless traffic test that includes test traffic data communicated between at least one of the UAVs and a tested wireless access point belonging to the plurality of wireless access points; and
a performance metrics module configured to determine, for each of the wireless access points to be tested, performance metric information associated with the test traffic data being wirelessly communicated between the tested wireless access point and at least one of the UAVs;
wherein each of the UAVs includes a communication module that is configured to establish a Wi-Fi communications link with each of the other UAVs.

9. A system for testing wireless access points associated with a wireless communications network, the system comprising:
a plurality of unmanned aerial vehicles (UAVs) configured to navigate within a service coverage area associated with a plurality of wireless access points belonging to a wireless communications network, wherein each of the UAVs includes:
a coordination module configured to assign each of the wireless access points;
a device emulation module configured to execute a wireless traffic test that includes test traffic data communicated between at least one of the UAVs and a tested wireless access point belonging to the plurality of wireless access points; and
a performance metrics module configured to determine, for each of the wireless access points to be tested, performance metric information associated with the test traffic data being wirelessly communicated between the tested wireless access point and at least one of the UAVs;
wherein the test traffic data is communicated, via the tested wireless access point, between two of the UAVs respectively functioning as a client entity and a server entity.

10. A system for testing wireless access points associated with a wireless communications network, the system comprising:

a plurality of unmanned aerial vehicles (UAVs) configured to navigate within a service coverage area associated with a plurality of wireless access points belonging to a wireless communications network, wherein each of the UAVs includes:
    a coordination module configured to assign each of the wireless access points;
    a device emulation module configured to execute a wireless traffic test that includes test traffic data communicated between at least one of the UAVs and a tested wireless access point belonging to the plurality of wireless access points; and
    a performance metrics module configured to determine, for each of the wireless access points to be tested, performance metric information associated with the test traffic data being wirelessly communicated between the tested wireless access point and at least one of the UAVs;
    wherein the test traffic data is communicated, via the tested wireless access point, between two of the UAVs functioning as peer controllers.

11. A method for testing wireless access points associated with a wireless communications network, the method comprising:
    navigating, by a plurality of unmanned aerial vehicles (UAVs), a service coverage area associated with a wireless communications network, wherein the service coverage area includes a plurality of wireless access points;
    assigning, by at least one of the UAVs, wireless access points to one or more of the UAVs for wireless traffic testing;
    executing, for each of the wireless access points, a wireless traffic test including test traffic data communicated between at least one of the UAVs and a tested wireless access point; and
    determining, for each of the wireless access points to be tested, performance metric information associated with traffic data being wirelessly communicated between the tested wireless access point and the at least one of the UAVs;
    wherein each of the UAVs is configured to navigate within the service coverage area using global positioning system (GPS) coordinates.

12. The method of claim 11 wherein executing a wireless traffic test includes emulating, by the at least one of the UAVs, multiple client devices that are wirelessly connected to the tested wireless access point via multiple wireless connections, wherein the emulated client devices generate emulated test traffic that is communicated to the tested wireless access point via the multiple wireless connections.

13. The method of claim 12 wherein determining performance metric information includes determining performance metric information associated with traffic data being wirelessly communicated between the tested access point and at least one of the emulated client devices.

14. The method of claim 11 wherein each of the UAVs is configured to autonomously navigate to a wireless charging area station in the event a power level of an onboard power supply falls below a predefined threshold.

15. The method of claim 11 establishing, by at least one real client device included in the at least one of the UAVs, a wireless connection with the tested wireless access point and communicating simulated test traffic data generated by the real client device to the wireless access point via the established wireless connection.

16. The method of claim 15 wherein determining performance metric information further includes determining performance metric information associated with the simulated test traffic data being wirelessly communicated between the wireless access point and the at least one real client device.

17. The method of claim 11 wherein executing a wireless traffic test includes emulating, by the at least one of the UAVs, multiple server devices that are wirelessly connected to a tested wireless access point via multiple wireless connections, wherein the emulated server devices generate emulated test traffic that is communicated to the tested wireless access point via the multiple wireless connections.

18. A method for testing wireless access points associated with a wireless communications network, the method comprising:
    navigating, by a plurality of unmanned aerial vehicles (UAVs), a service coverage area associated with a wireless communications network, wherein the service coverage area includes a plurality of wireless access points;
    assigning, by at least one of the UAVs, wireless access points to one or more of the UAVs for wireless traffic testing;
    executing, for each of the wireless access points, a wireless traffic test including test traffic data communicated between at least one of the UAVs and a tested wireless access point; and
    determining, for each of the wireless access points to be tested, performance metric information associated with traffic data being wirelessly communicated between the tested wireless access point and the at least one of the UAVs;
    wherein communication among the UAVs is conducted via established Wi-Fi links.

19. A method for testing wireless access points associated with a wireless communications network, the method comprising:
    navigating, by a plurality of unmanned aerial vehicles (UAVs), a service coverage area associated with a wireless communications network, wherein the service coverage area includes a plurality of wireless access points;
    assigning, by at least one of the UAVs, wireless access points to one or more of the UAVs for wireless traffic testing;
    executing, for each of the wireless access points, a wireless traffic test including test traffic data communicated between at least one of the UAVs and a tested wireless access point; and
    determining, for each of the wireless access points to be tested, performance metric information associated with traffic data being wirelessly communicated between the tested wireless access point and the at least one of the UAVs;
    wherein the test traffic data is communicated, via the tested wireless access point, between two of the UAVs respectively functioning as a client entity and a server entity.

20. A non-transitory computer readable medium having stored thereon executable instructions that when executed by the processor of a computer control the computer to perform steps comprising:
    navigating, by a plurality of unmanned aerial vehicles (UAVs), a service coverage area associated with a wireless communications network, wherein the service coverage area includes a plurality of wireless access points;

assigning, by at least one of the UAVs, wireless access points to one or more of the UAVs for wireless traffic testing;

executing, for each of the wireless access points to be tested, a wireless traffic test including test traffic data communicated between at least one of the UAVs and the tested wireless access point; and determining, for each of the wireless access points, performance metric information associated with the test traffic data being wirelessly communicated between the tested wireless access point and the at least one of the UAVs;

wherein each of the UAVs is configured to navigate within the service coverage area using global positioning system (GPS) coordinates.

* * * * *